US008655096B2

(12) United States Patent
Crandall et al.

(10) Patent No.: US 8,655,096 B2
(45) Date of Patent: Feb. 18, 2014

(54) AUTOMATIC IMAGE SHARPENING USING ENTROPY-BASED BLUR RADIUS

(75) Inventors: Richard E. Crandall, Portland, OR (US); Jason Alexis Klivington, Portland, OR (US); Rudolph van der Merwe, Portland, OR (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 13/250,989

(22) Filed: Sep. 30, 2011

(65) Prior Publication Data

US 2013/0084019 A1 Apr. 4, 2013

(51) Int. Cl.
*G06K 9/40* (2006.01)

(52) U.S. Cl.
USPC ........................................................ 382/255

(58) Field of Classification Search
None
See application file for complete search history.

(56) References Cited

U.S. PATENT DOCUMENTS

| | | | | |
|---|---|---|---|---|
| 6,470,097 | B1 * | 10/2002 | Lai et al. | 382/255 |
| 7,184,578 | B2 | 2/2007 | Simon et al. | |
| 7,616,826 | B2 | 11/2009 | Freeman et al. | |
| 2006/0139369 | A1 * | 6/2006 | Zimmer et al. | 345/611 |
| 2007/0019883 | A1 | 1/2007 | Wong et al. | |
| 2009/0066818 | A1 | 3/2009 | Lim et al. | |
| 2009/0316995 | A1 | 12/2009 | Szeliski et al. | |

FOREIGN PATENT DOCUMENTS

| | | |
|---|---|---|
| WO | 2009/073006 | 6/2009 |
| WO | 2009/153717 | 12/2009 |

OTHER PUBLICATIONS

Kristan, Matej, and F. Pernus. "Entropy based measure of camera focus." Proceedings of the thirteenth Electrotechnical and Computer Science Conference ERK. 2004.*
Kokaram, A. C., et al. "Restoration of images from the scanning-tunneling microscope." Applied optics 34.23 (1995): 5121-5132.*
Le Cui et al: "Restoration of Defocus Blur Image Based on Global Phase Coherence", Image and Signal Processing, 2009. CISP •G9. 2nd International Congress on, IEEE, Piscataway, NJ, USA, Oct. 17, 2009, pp. 1-5, XP031555959, ISBN: 978-1-4244-4129-7 abstract figure 8.
Mohsen Ebrahimi Moghaddam Ed—Anonymous; "Out of focus blur estimation using genetic algorithm", Systems, Signals and Image Processing, 2008. IWSSIP 2008. 15th International Conference on, IEEE, Piscataway, NJ, USA, Jun. 25, 2008, pp. 417-420, XP031310473, ISBN: 978-80-227-2856-0.
Farzin Aghdasi et al: "Reduction of Boundary Artifacts in Image Restoration", IEEE Transactions on Image Processing, IEEE Service Center, Piscataway, NJ, US, vol. 5, No. 4, Apr. 1, 1996, XP011025975, ISSN: 1057-7149.
International Search Report and Written Opinion of the International Searching Authority, PCT Application Serial No. PCT/US2012/058034, Nov. 20, 2012, 13 pp.

* cited by examiner

*Primary Examiner* — Bhavesh Mehta
*Assistant Examiner* — Andrew Moyer
(74) *Attorney, Agent, or Firm* — Fish & Richardson P.C.

(57) ABSTRACT

Systems, methods and computer program products are disclosed for automatic image sharpening. Automatic image sharpening techniques are disclosed that automatically bring a blurred image into focus. Techniques for reducing edge ringing in sharpened images are also disclosed. According to implementations, a computer-implemented method includes determining a normalized entropy of a first image, calculating a correlation target based on the normalized entropy, automatically determining a blur radius of a de-convolution kernel that causes a cosine of a first radial power spectrum of the kernel and a second radial power spectrum of a reconstruction of the first image to approximate the correlation target and generating a second image based on the blur radius.

21 Claims, 5 Drawing Sheets

AUTOMATIC IMAGE SHARPENING USING ENTROPY-BASED BLUR RADIUS

TECHNICAL FIELD

The disclosure generally relates to digital image processing.

BACKGROUND

Modern digital photography equipment and related software editing applications have simplified capturing, viewing, storing and editing digital images. For example, a user may capture a blurred image with a digital camera and may desire to sharpen the blurred digital image. Some digital image editing applications allow a user to manually sharpen blurred images by manually adjusting blur radius and noise values for a blurred image. Such manual adjustment can be tedious and time consuming. Moreover, the process of manually sharpening digital images may introduce artifacts, such as edge ringing, into the sharpened image.

SUMMARY

Automatic image sharpening techniques are disclosed that automatically bring a blurred image into focus. Techniques for reducing edge ringing in sharpened images are also disclosed. According to implementations, a computer-implemented method includes determining a normalized entropy of a first image, calculating a correlation target based on the normalized entropy, automatically determining a blur radius of a de-convolution kernel that causes a cosine of a first radial power spectrum of the kernel and a second radial power spectrum of a reconstruction of the first image to approximate the correlation target, and generating a second image based on the blur radius.

According to an implementation, automatically determining a blur radius includes automatically adjusting a blur radius of the de-convolution kernel. The method may include extending one or more dimensions of an original image to define a space around the original image and reflecting edge portions of the original image into the space to generate the first image. The original image may be extended and padded such that the asymptotic exterior value of the first image in each color channel is the mean value of each color channel of the original image.

According to implementations, the computer-implemented method may also include calculating the correlation target (C) according to the following equation: $C=a+(b+c(\text{sgn}(E_{n,o})))E_{n,o}$, where a, b, and c are coefficients and $E_{n,o}$ is the normalized entropy of the first image. The normalized entropy may be restricted to an interval by hard clipping.

Particular implementations provide one or more of the following advantages: 1) an image can be automatically sharpened without the use of any human input, and 2) edge ringing in the sharpened image is minimized. Automatic image sharpening can be used in a variety of applications including but not limited to monocular 3D sensing and batch-focusing applications.

A computer program product and a system for automatic image sharpening are also disclosed. Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Automatic image sharpening techniques are disclosed that automatically bring a blurred image into focus. Techniques for reducing edge ringing in sharpened images are also disclosed.

Deconvolution Theory

Wiener de-convolution is a process whereby an approximate de-convolution kernel is created in spectral space. Denote an image intensity by $p(\vec{r})=p(x,y)$, and denote its 2-dimensional Fourier transform by:

$$P(\vec{\omega})=\int p(\vec{r})e^{-i\vec{\omega}\cdot\vec{r}}d^2\vec{r}. \quad [1]$$

Where the integration range is not specified, the transformation is a discrete fast Fourier result, namely:

$$P(x,y):=\sum_{x=0}^{W-1}\sum_{y=0}^{H-1}p(x,y)e^{-2\Pi i(x/W+y/H)} \quad [2]$$

for image dimensions W×H (width×height). A blurred image is taken to be a convolution $$q(\vec{r})=p\times b:=\int p(\vec{r}-\vec{s})b(\vec{s})d^2\vec{s}, \quad [3]$$

where b is a blur kernel and p denotes an original (presumed sharp) image. The blurred image q is modeled as a finite, discrete convolution, rather than an integral. The classical convolution theorem indicates that the blurred image q has Fourier transform given by $$Q(\vec{w})=P(\vec{w})\cdot B(\vec{w}), \quad [4]$$

where B is the Fourier transform of the blur kernel. To de-convolve (sharpen) the blurred image an inversion relation such as $$P(\vec{w})\sim\frac{Q(\vec{w})}{B(\vec{w})}, \quad [5]$$

can be inferred to transform q back to the original image p. Equivalently, an "inverse kernel" $e(\vec{r})$ may exist such that $$e\times b\sim\delta, \quad [6]$$

where δ is the unit 2-dimensional impulse. In spectral terms, this is $$E(\vec{w})\sim\frac{1}{B(\vec{w})}. \quad [7]$$

The essential de-convolution operation attempts recovery of the original image p from the blurred image q via the convolution p~q×e. The rest of the present treatment focuses upon the problem of calculating a suitable, approximate inverse kernel e.

The Wiener Formula for Deconvolution

If an inverse kernel's Fast Fourier Transform (FFT) E(w) is well approximated, it may be used to approximate the original image. The problem is that taking just the reciprocal of the blur kernel's FFT, namely setting E:=1/B, induces singularities, or at least specious behavior (excessive ringing, for example) due to possibly small values of |B|. There are at least three variants of the Wiener prescription, by which variants the theoretical inverse-kernel transform E is replaced by a non-pathological approximation E'. The models are defined as follows:

(1) The constant noise model:

$$E' = \frac{E(\vec{w})*}{|E(\vec{w})|^2 + \eta^2}, \quad [8]$$

where η is a constant preventing zeros in the denominator.

(2) The floor model:

$$E' = \frac{E(\vec{w})*}{\max(|E(\vec{w})|^2 + \eta^2)}, \quad [9]$$

where η prevents denominator zeros.

(3) The full noise model:

$$E' = \frac{E(\vec{w})*}{|E(\vec{w})|^2 + \frac{N(\vec{w})}{S(\vec{w})}}, \quad [10]$$

where N/S is a frequency-dependent noise-to-signal ratio.

An automatic means of estimating N/S for variant (3) is now described. Variant (2), which provides a certain stability that accrues with the floor method, is described further below.

Given an approximate Wiener kernel E', a reconstructed image $$\rho(\vec{r}) = \frac{1}{4\Pi^2} \int Q(\vec{w}) E'(\vec{w}) e^{+i\vec{w}\cdot\vec{r}} d^2 \vec{w}, \quad [11]$$

presumably, has the desirable property of being, for proper Wiener parameters, close to the sharp original namely ρ~ρ in some visually appropriate sense. Based on this presumption, blurred image de-convolution is described below.

Image Extension/Padding to Minimize Edge Ringing

Figure 1:
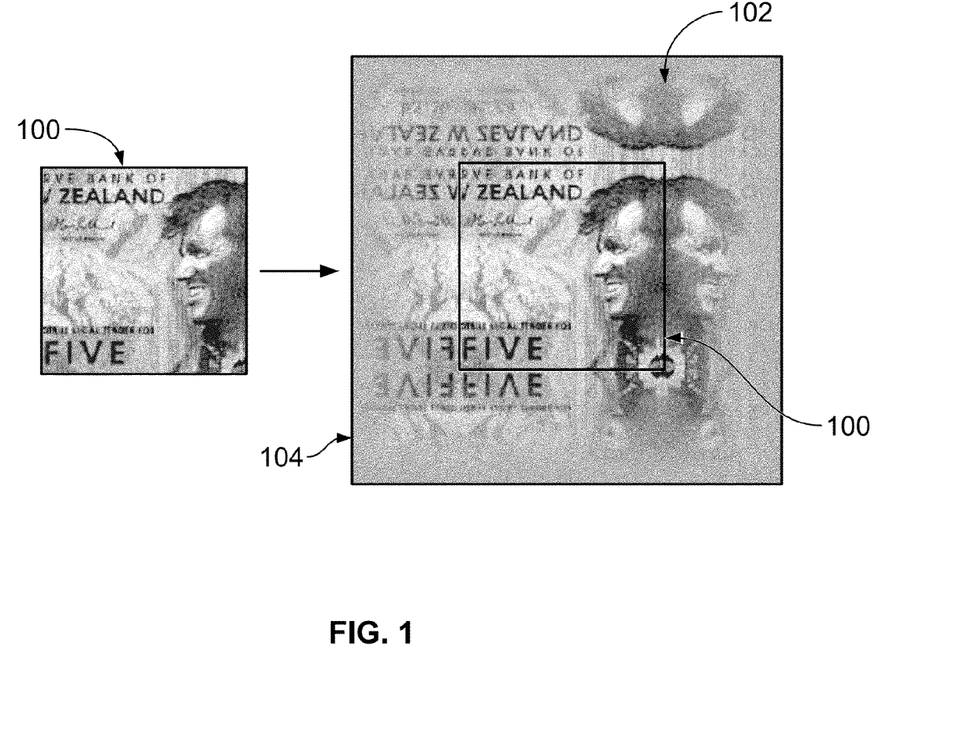
FIG. 1 illustrates an exemplary process for extending/padding images to minimize edge ringing.

FIG. 1 illustrates an exemplary process for extending/padding images to minimize edge ringing. Prior to Wiener de-convolution, the image may be reflected-and-damped, with the asymptotic exterior value being the image mean (in each color channel). For example, image 100 of FIG. 1 is extended/padded to generate space 102 around image 100 that contains portions of image 100 that have been reflected across the edges (vertical and horizontal) of image 100. The image 104, including the original image 100 and the extended image space 102, is then processed to sharpen the original image 100. Edge ringing may thereby be reduced in a sharpened image according to the techniques described herein.

Determining a Correlation Target

Figure 2:
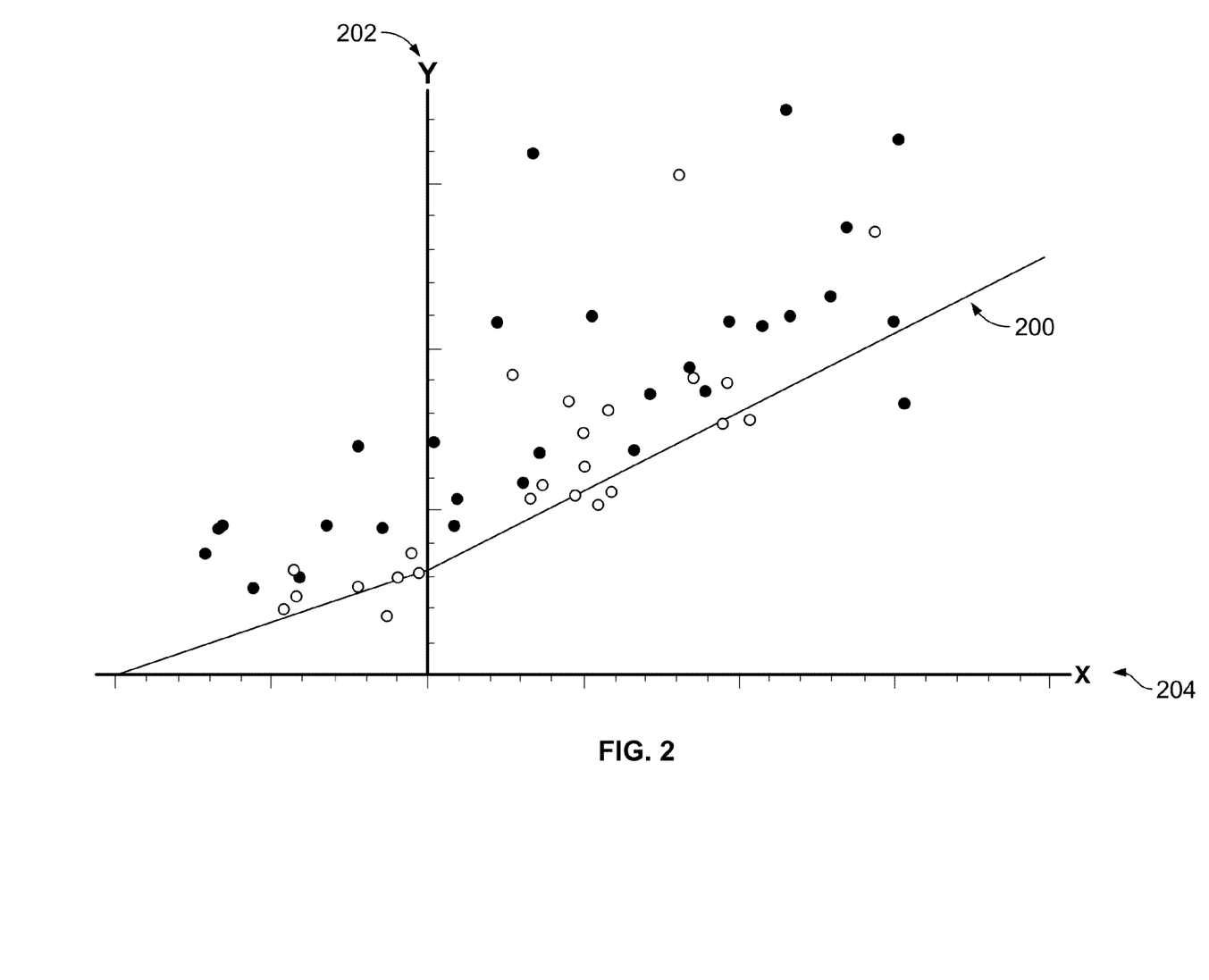
FIG. 2 is a scatterplot of test images illustrating empirically determining a theoretical correlation target.

FIG. 2 is a scatterplot of test images illustrating empirically determining a theoretical correlation target. The empirical data in the scatterplot of FIG. 2 indicates that at the point of ideal focus, a certain multidimensional angle in spectral space is strongly correlated with the normalized entropy ($E_{n,o}$) in configuration space. For example, the scatterplot shows data points for 29 low resolution images (closed circle) and 24 high resolution images (open circle) under subjective manual focus. The scatterplot also shows an important phenomenon: when the ideal deblur radius r is attained, the angular measure $C_{w,r}$ (vertical axis, 202 of FIG. 2) is well correlated with $E_{n,o}$ (horizontal axis, 204 of FIG. 2). The correlation between $C_{w,r}$ and $E_{n,o}$ is illustrated by the straight-line segments 200. The straight-line segments 200 are not best-fit lines in the standard sense of regression. Rather, they are lines that tend to bound most points below so as to minimize edge ringing. According to implementations, the straight-line segments 200 define a correlation target for automatic image sharpening, as discussed further below.

Automatic Image Sharpening

According to implementations, automatic image sharpening is performed on a rectangular selection ("original image") that has been padded according to the extension-and-padding rules disclosed above. Automatic image sharpening performed according to implementations disclosed herein produces an explicit r, η (blur-radius, noise) pair used to focus the original image.

Figure 3:
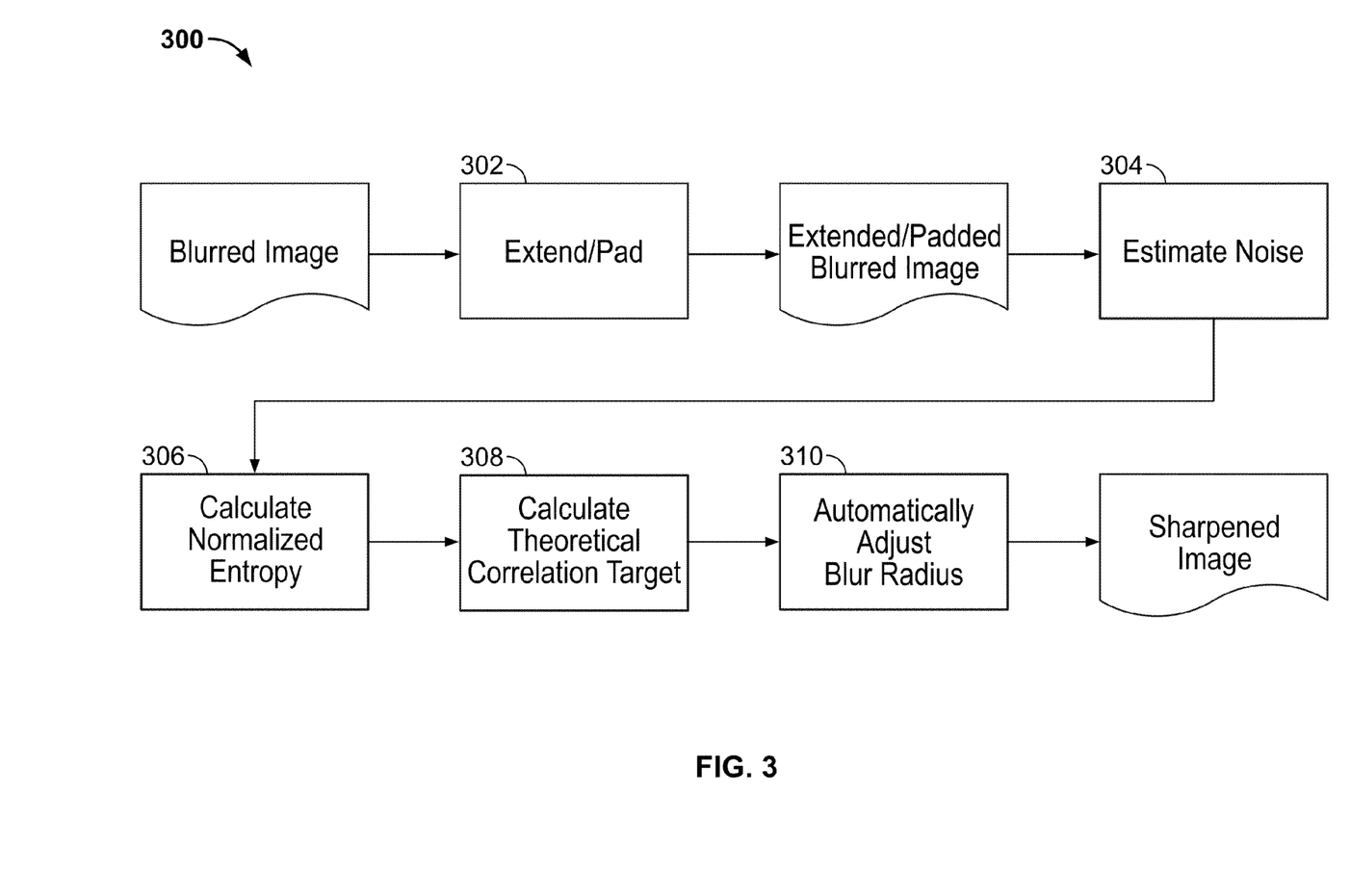
FIG. 3 is a block diagram of an exemplary automatic image sharpening system.

FIG. 3 is a block diagram of an exemplary automatic image sharpening system. At step 302, a blurred image is extended and padded, according to implementations. For example, a blurred image may be received by system 300. System 300 may extend and pad the blurred image according to the extension-and-padding rules disclosed above and as illustrated by FIG. 1.

At step 304, the extended and padded blurred image is analyzed to automatically estimate the amount of noise in the image. For example, automatic noise adjustment and estimation may start with a radial-FFT histogram. For the two indices (u,v) of the standard, 2-dimensional FFT on the extended and padded image, we zero histogram-bin values h(1) . . . h(L) where L:=⌈N/√2⌉ for FFT side N (square, N×N FFTs are used). Then if p(u,v) denotes the local spectral power, namely $\equiv X_{u,v}|^2$, then an L×L square is passed over the image, and values are added into histogram bins according to $$h(\lceil\sqrt{u^2+v^2}+1/2\rceil) +\!= p(u,v), \quad [12]$$

whenever the argument of h here is in [1, L]. For example, this way of forming a radial histogram weights the higher frequencies because of their larger arcs in the FFT square. For white noise that is transformed by an FFT to give a statistically uniform FFT power-square, the histogram element h(w) should rise linearly in integer w. For this reason, the radial power spectrum is denoted by $$R(w) := \frac{h(w)}{w}; w \in [1, L]. \quad [13]$$

Assuming that the original 2-dimensional signal has Laplacian autocorrelation, the radial power spectrum can be inferred to be approximately $$R_{th}(w) \sim \int e^{-i\vec{w}\cdot\vec{r}} e^{-Kr} d^2 \vec{r}, \quad [14]$$

where $\vec{w}$ is any fixed vector of length w, and K is the Laplacian decay constant. This 2-dimensional integral admits of exact evaluation, and the radial-FFT histogram approximation may be expressed as $$R_{th}(w) = \frac{A}{(B+w^2)^{3/2}}, \quad [15]$$

for constants A, B. The ensuing algorithmic development involves stable estimation of the A, B parameters.

According to implementations, the noise/signal Wiener kernel may be approximated by $$\frac{E(u,v)*}{|E(u,v)|^2 + \frac{N(w)}{S(w)}}, \quad [16]$$

where $w := \sqrt{u^2 + v^2}$, and S/N is the signal-to-noise ratio (SNR). To affect an auto-noise algorithm in this way, the following nomenclature is established. Assign $$P := \sum_{w=1}^{L} R(w), \quad [17]$$

$$\sigma^2 := \frac{1}{P}\sum_{w=1}^{L} w^2 R(w), \quad [18]$$

$$w_1 := \lfloor \min(3\sigma, 0.4L) \rfloor, \quad [19]$$

$$w_2 := \lfloor \min(10\sigma, 0.5L) \rfloor, \quad [20]$$

$$P_1 := \sum_{w=1}^{w_1} R(w), \quad [21]$$

$$P_2 := \sum_{w=w_2}^{L} R(w), \quad [22]$$

$$B := w_1^2 \left(\frac{P^2}{P_1^2} - 1\right), \quad [23]$$

$$A := BP. \quad [24]$$

The noise-function and signal-function forms may be approximated by $$N(w) \sim \frac{P_2}{L-w_2}, \quad [25]$$

$$S(w) \sim R_{th}(w), \quad [26]$$

respectively, and the above parameter assignments may be used to estimate A, B. The Wiener kernel, thought of as depending on a low-frequency "signal" and a "noise" tail for the guess $R_{th}$, works out to be $$E' = \frac{E(u,v)*}{|E(u,v)|^2 + \eta^2 \frac{P_2}{L-w_2} \frac{(B+w^2)^{3/2}}{A}}, \quad [27]$$

where $w := \sqrt{u^2+v^2}$ in this kernel formula. The constant η is a tuning constant.

At step 306, the normalized entropy of the image is calculated, according to implementations. For example, normalized entropy, denoted $E_{n,o}$, may be calculated by first applying a predictor/corrector (P/C) to the luminance (Y) channel, in the form a+d−b−c, for the 4 pixel arrangement:

$$\begin{array}{cc} a & b \\ c & d \end{array} \quad [28]$$

Then, the entropy of the resulting P/C data is calculated. The entropy calculation is done with 128 bins from [−62, 63], which are used to generate a histogram, with overflow and underflow clamped to maximum and minimum values. Once the bins are filled, then the "standard" entropy $E_s$ is calculated as the usual weighted-logarithmic sum over bins. Then, the normalized entropy $E_{n,o}$ may be calculated by $$E_{n,o} = E_s - \log_2(M/16), \quad [29]$$

where M denotes the mean of the Y-channel. This adjustment is intended to nullify the effects of overall image brightness based on the idea that the ultimate entropy of a dim version of an image should have entropy equal to a brighter version of the image.

High-Dimensional Dot Products in Spectral Space

To calculate high-dimensional dot products in spectral space, consider the radial power spectrum R(w) depending on a scalar parameter w=|w| with w deemed 2-dimensional. For any of the computed 2-dimensional FFTs, one may employ bin averaging to estimate such an R. Denote by $R_w$ the radial power spectrum for the Wiener kernel $E'(\vec{w})$, and by $R_r$ the power spectrum for the reconstruction of a source image; this can be the power spectrum of the kernel $Q(\vec{w}) E'(\vec{w})$. The cosine between the "signals" $R_w$ and $R_r$ is defined as $$C_{w,r} := \frac{R_w \cdot R_r}{|R_w||R_r|}. \quad [30]$$

The dot-product is obtained by summing over all radii such that $$R \cdot S := \sum_w R(w)S(w), \quad [31]$$

$$R := \sqrt{R \cdot R}. \quad [32]$$

So that $C_{w,r}$ is a number that is the cosine of the dimensional angle between two radial power spectra.

At step 308, a theoretical correlation target is calculated, according to implementations. For example, starting with a default pair (r,η), for example (2.0, 0.45), and applying the floor noise model, as described above, a theoretical correlation target C (i.e., the vertical coordinate of FIG. 2) may be calculated according to $$C = a + (b + c(\text{sgn}(E_{n,o})))E_{n,o}, \quad [33]$$

where a, b and c are coefficients determined based on empirical data and where $E_{n,o}$ has been restricted to the interval [−2, 4] by hard clipping. For example, image analysis may indicate that a, b and c should vary based on the type of images being processed. According to at least one implementation, a=0.032, b=0.020 and c=0.004. Other values for these coefficients may be used to automatically sharpened images. According to implementations, the target C is a piecewise straight line, as illustrated by FIG. 2, line 200.

At step 310, the blur radius is automatically adjusted to produce a sharpened image, according to implementations. For example, system 300 may automatically search for a Wiener de-convolution kernel blur radius $r \in [0, \infty]$ that forces $C_{w,r} \approx C$. According to implementations, $C_{w,r}$ is the (raw) cosine between the radial power spectrum of the Wiener kernel and the radial power spectrum of the reconstruction of a source image, as defined above. Upon finding the optimal blur radius, the blur radius and noise values (r, η) may be used to automatically sharpen the original blurred image.

Exemplary Process

Figure 4:
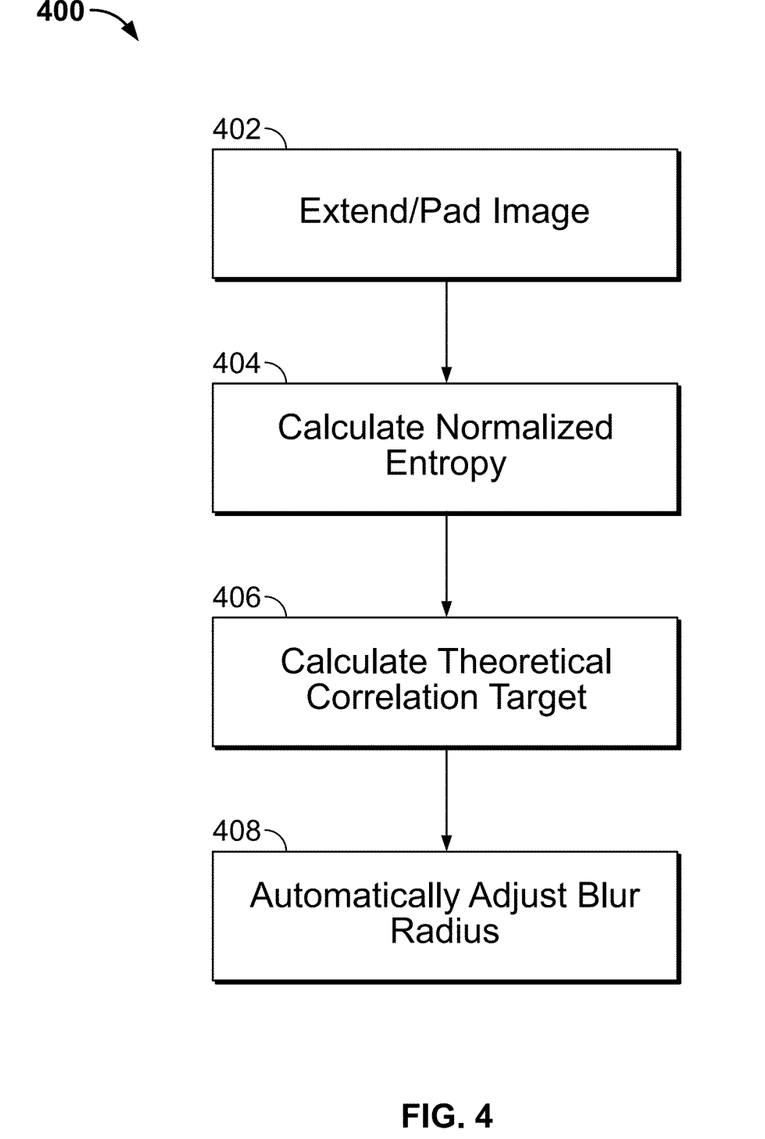
FIG. 4 is flow diagram of an exemplary automatic image sharpening process.

FIG. 4 is flow diagram of an exemplary automatic image sharpening process. At step 402, an image is extended and padded. For example, an original blurred image may be extended along one or more dimensions to define a space around the original image. Edge portions of the original image may be reflected into the space to generate an extended/padded image. The extended image may have an asymptotic exterior value in each color channel that is the mean color channel value for the original image. The extending/padding process is disclosed in more detail in the description of FIG. 1, above.

At step 404, a normalized entropy is calculated, according to implementations. For example, the normalized entropy of the image may be calculated in the manner disclosed in step 306 of FIG. 3, detailed above.

At step 406, a theoretical correlation target is calculated, according to implementations. For example, the theoretical correlation target may be calculated in the manner disclosed in step 308 of FIG. 3, detailed above.

At step 408, the blur radius is automatically adjusted according to implementations. For example, once the theoretical correlation target is calculated, an optimal blur radius may be determined, as detailed above with respect to step 310 of FIG. 3. Once determined, the optimal blur radius may be used to define a Wiener de-convolution kernel for sharpening an original blurred image.

Exemplary System Architecture

Figure 5:
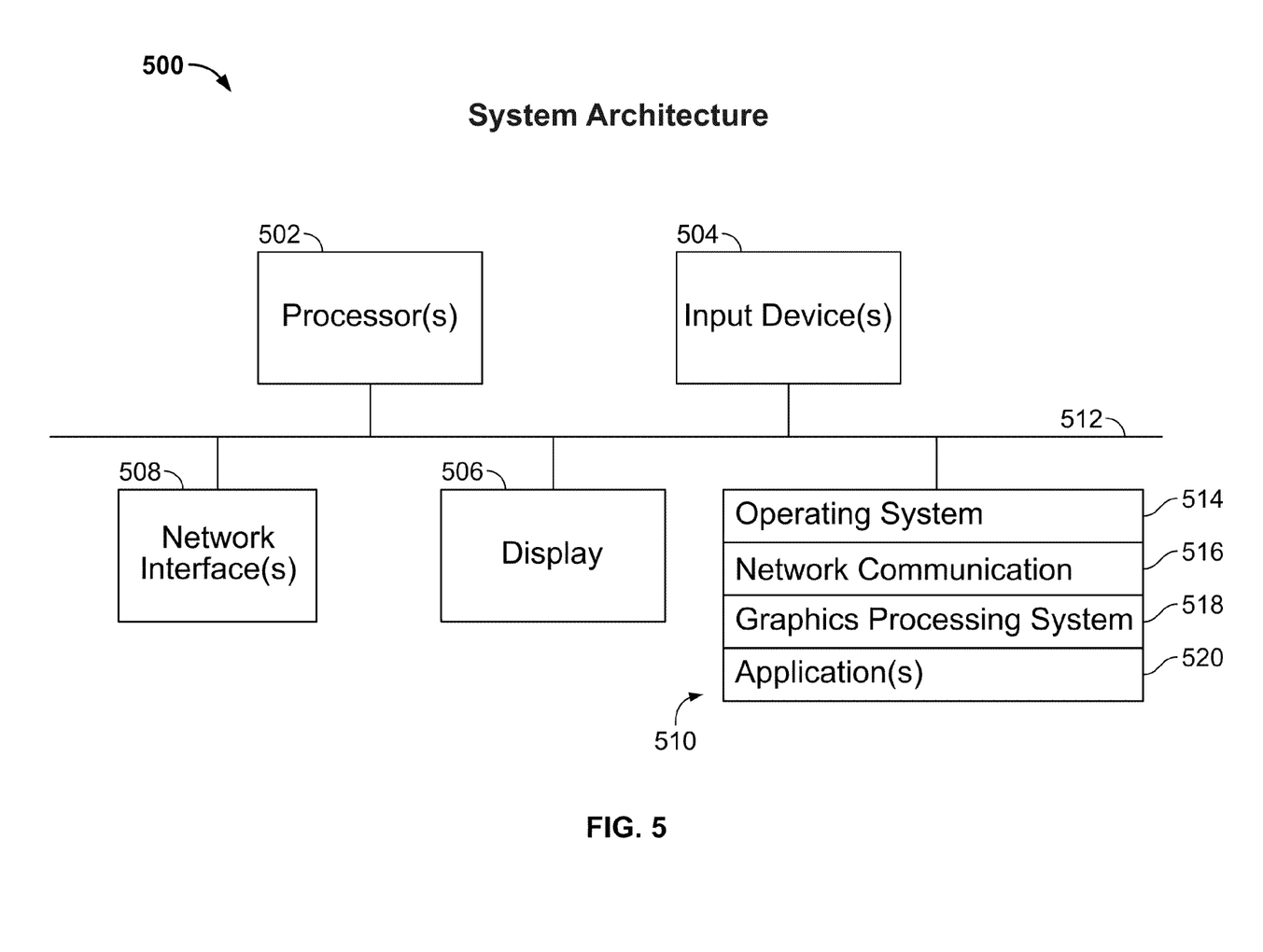
FIG. 5 is a block diagram of an exemplary system architecture implementing the features and processes of FIGS. 1-4.

FIG. 5 is a block diagram of an exemplary system architecture implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire. Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.).

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. For example, the graphics processing system 518 can implement the processes, as described with reference to FIGS. 1-4.

Application(s) 520 can be an image processing application or any other application that uses the processes described in reference to FIGS. 1-4, such as a photo or video editor. The processes can also be implemented in operating system 514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

Exemplary Automatic Image Sharpening Applications

One example application of automatic image sharpening is automatic depth-sensing using one image. For example, as each patch of a blurred image is processed, the blur radius from step 310 of FIG. 3 may be logged on a per-patch basis. Each logged blur radius can then be equated, or monotonically mapped, to a z-axis estimate. This depth-sensing process may be applied to images having depth-blur.

Another application is batch focus. For example, a large set of street-map images can be run through the automatic image sharpening processes described above to focus each single image. Focusing a large set of images can be impractical if the process requires manual-human input. Other image processing applications can also benefit from the automatic image sharpening described herein.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A computer-implemented method comprising:
    determining a normalized entropy of a first image;
    determining a correlation target based on the normalized entropy;
    determining a cosine of a first radial power spectrum of the kernel and a second radial power spectrum of a reconstruction of the first image;
    automatically determining a blur radius of a de-convolution kernel that forces the cosine to approximate the correlation target; and
    generating a second image based on the blur radius.

2. The computer-implemented method of claim 1, wherein automatically determining a blur radius comprises automatically adjusting a blur radius of the de-convolution kernel.

3. The computer-implemented method of claim 1, further comprising:
    extending one or more dimensions of an original image to define a space around the original image; and
    reflecting edge portions of the original image into the space to generate the first image.

4. The computer-implemented method of claim 3, wherein an asymptotic exterior value of the first image in each color channel is a mean of the first image.

5. The computer-implemented method of claim 1, further comprising:
    calculating the correlation target (C) according to the following equation $$C = a + (b + c(\text{sgn}(E_{n,o})))E_{n,o},$$

where a, b, and c are coefficients and $E_{n,o}$ is the normalized entropy of the first image.

6. The computer-implemented method of claim 1, wherein the normalized entropy is restricted to an interval by hard clipping.

7. The computer-implemented method of claim 5, wherein a is at least 0.032, b is at least 0.020 and c is at least 0.004.

8. A computer program product, encoded on a non-transitory storage device, operable to cause a data processing apparatus to perform operations comprising:
    determining a normalized entropy of a first image;
    determining a correlation target based on the normalized entropy;
    determining a cosine of a first radial power spectrum of the kernel and a second radial power spectrum of a reconstruction of the first image;
    automatically determining a blur radius of a de-convolution kernel that forces the cosine to approximate the correlation target; and
    generating a second image based on the blur radius.

9. The program product of claim 8, wherein automatically determining a blur radius comprises automatically adjusting a blur radius of the de-convolution kernel.

10. The program product of claim 8, further comprising:
extending one or more dimensions of an original image to define a space around the original image; and
reflecting edge portions of the original image into the space to generate the first image.

11. The program product of claim 10, wherein an asymptotic exterior value of the first image in each color channel is a mean of the first image.

12. The program product of claim 8, further comprising:
calculating the correlation target (C) according to the following equation $$C=a+(b+c(\text{sgn}(E_{n,o})))E_{n,o},$$

where a, b, and c are coefficients and $E_{n,o}$ is the normalized entropy of the first image.

13. The program product of claim 8, wherein the normalized entropy is restricted to an interval by hard clipping.

14. The program product of claim 12, wherein a is at least 0.032, b is at least 0.020 and c is at least 0.004.

15. A system comprising:
at least one processor;
a computer-readable storage medium storing one or more sequences of instructions which, when by the at least one processor, causes:
determining a normalized entropy of a first image;
determining a correlation target based on the normalized entropy;
determining a cosine of a first radial power spectrum of the kernel and a second radial power spectrum of a reconstruction of the first image;
automatically determining a blur radius of a de-convolution kernel that forces the cosine to approximate the correlation target; and
generating a second image based on the blur radius.

16. The system of claim 15, wherein automatically determining a blur radius comprises automatically adjusting a blur radius of the de-convolution kernel.

17. The system of claim 15, further comprising:
extending one or more dimensions of an original image to define a space around the original image; and
reflecting edge portions of the original image into the space to generate the first image.

18. The system of claim 17, wherein an asymptotic exterior value of the first image in each color channel is a mean of the first image.

19. The system of claim 15, further comprising:
calculating the correlation target (C) according to the following equation $$C=a+(b+c(\text{sgn}(E_{n,o})))E_{n,o},$$

where a, b, and c are coefficients and $E_{n,o}$ is the normalized entropy of the first image.

20. The system of claim 15, wherein the normalized entropy is restricted to an interval by hard clipping.

21. The system of claim 19, wherein a is at least 0.032, b is at least 0.020 and c is at least 0.004.

* * * * *